United States Patent
Yokogi et al.

(10) Patent No.: US 8,937,146 B2
(45) Date of Patent: Jan. 20, 2015

(54) POLYCARBONATE RESIN AND TRANSPARENT FILM COMPRISING THE SAME

(71) Applicants: Mitsubishi Chemical Corporation, Chiyoda-ku (JP); Nitto Denko Corporation, Ibaraki-shi (JP)

(72) Inventors: Masashi Yokogi, Fukuoka (JP); Shingo Namiki, Fukuoka (JP); Tomohiko Tanaka, Fukuoka (JP); Nao Murakami, Osaka (JP)

(73) Assignees: Mitsubishi Chemical Corporation, Chiyoda-ku (JP); Nitto Denko Corporation, Ibaraki-shi (JP)

( * ) Notice: Subject to any disclaimer, the term of this patent is extended or adjusted under 35 U.S.C. 154(b) by 0 days.

(21) Appl. No.: 14/077,768

(22) Filed: Nov. 12, 2013

(65) Prior Publication Data

US 2014/0073757 A1 Mar. 13, 2014

Related U.S. Application Data

(63) Continuation of application No. PCT/JP2012/061771, filed on May 8, 2012.

(30) Foreign Application Priority Data

May 9, 2011 (JP) ................................. 2011-104546

(51) Int. Cl.
| | |
|---|---|
| *C08G 64/00* | (2006.01) |
| *C08G 64/16* | (2006.01) |
| *G02B 5/30* | (2006.01) |
| *B29D 7/01* | (2006.01) |
| *C08G 63/02* | (2006.01) |
| *B29K 69/00* | (2006.01) |

(52) U.S. Cl.
CPC .......... *C08G 64/1608* (2013.01); *G02B 5/3083* (2013.01); *B29D 7/01* (2013.01); *B29K 2069/00* (2013.01)
USPC ......... 528/196; 528/198; 428/411.1; 428/412

(58) Field of Classification Search
USPC ........................ 528/196, 198; 428/411.1, 412
See application file for complete search history.

(56) References Cited

U.S. PATENT DOCUMENTS

2012/0308796 A1 12/2012 Tanaka et al.

FOREIGN PATENT DOCUMENTS

| | | |
|---|---|---|
| GB | 1079686 | 5/1963 |
| JP | 2004-067990 | 3/2004 |
| JP | 2005-146140 | 6/2005 |
| JP | 2006-026441 | 2/2006 |
| JP | 2012-031369 | 2/2012 |
| WO | 2006/041190 | 4/2006 |
| WO | 2009/075304 | 6/2009 |
| WO | 2010/064721 | 6/2010 |
| WO | 2011/062163 | 5/2011 |

OTHER PUBLICATIONS

U.S. Appl. No. 14/291,730, May 30, 2014, Tanaka, et al.
U.S. Appl. No. 14/150,363, filed Jan. 8, 2014, Namiki, et al.
International Search Report issued Jun. 12, 2012 in PCT/JP2012/061771 filed May 8, 2012.
Office Action issued Nov. 3, 2014 in CN Patent Application No. 201280021775.6 with English language translation.

*Primary Examiner* — Terressa Boykin
(74) *Attorney, Agent, or Firm* — Oblon, Spivak, McClelland, Maier & Neustadt, L.L.P.

(57) ABSTRACT

The polycarbonate resin of the present invention comprises a structural unit derived from a dihydroxy compound represented by a specific formula (1), a structural unit derived from a dihydroxy compound represented by a specific formula (2), and a structural unit derived from a dihydroxy compound represented by any one of specific formulae (3) to (6), wherein the content of structural units derived from dihydroxy compounds represented by the specific formulae (3) to (6) is within a specific range based on the total of structural units derived from dihydroxy compounds in the polycarbonate resin.

9 Claims, No Drawings

POLYCARBONATE RESIN AND TRANSPARENT FILM COMPRISING THE SAME

TECHNICAL FIELD

The present invention relates to a polycarbonate resin and a transparent film comprising the same.

BACKGROUND ART

A polycarbonate resin is generally produced using a raw material derived from petroleum resources, but in recent years, depletion of petroleum resources is feared, and it is demanded to provide a polycarbonate resin using a raw material obtained from biomass resources such as plant. In addition, since global warming due to increase or accumulation of carbon dioxide emissions brings about climate change or the like, there is a demand to develop a polycarbonate resin using, as a raw material, a plant-derived monomer that is carbon neutral even when discarded after use.

Under these circumstances, for example, a technique of using isosorbide as a plant-derived monomer and obtaining a polycarbonate through transesterification with diphenyl carbonate has been proposed (see, for example, Patent Document 1).

On the other hand, a polycarbonate resin containing isosorbide as a raw material has high transparency, low photoelastic coefficient and heat resistance and therefore, its use for optical application such as retardation plate or substrate of a liquid display device has been proposed (see, for example, Patent Document 2). Also, a polycarbonate resin using, as raw materials, 9,9-bis(4-(2-hydroxyethoxy)phenyl)fluorene and isosorbide and being low in the photoelastic coefficient, excellent in the heat resistance and moldability and suitable for optical application has been proposed (see, for example, Patent Document 3). Furthermore, a film composed of a polycarbonate terpolymer resin using, as raw materials, isosorbide, biscresolfluorene and, for example, an aliphatic diol, an alicyclic diol or spiroglycol has been also disclosed, and it is indicated that a retardation film composed of this polycarbonate resin is low in the photoelastic coefficient and moreover, exhibits a reverse wavelength dispersibility of decreasing in the retardation as the wavelength becomes shorter (see, for example, Patent Document 4). In addition, a retardation film composed of a polycarbonate bipolymer resin using, as raw materials, isosorbide and biscresolfluorene or 9,9-bis(4-(2-hydroxyethoxy)phenyl)fluorene is disclosed (see, for example, Patent Document 5).

BACKGROUND ART DOCUMENT

Patent Document

Patent Document 1: GB Patent 1,079,686
Patent Document 2: JP-A-2006-28441 (the term "JP-A" as used herein means an "unexamined published Japanese patent application")
Patent Document 3: JP-A-2004-67990
Patent Document 4: International Publication No. 2006/41190
Patent Document 5: International Publication No. 2010/64721

SUMMARY OF INVENTION

Problem that Invention is to Solve

Recently, in the field of transparent film including an optical film such as retardation film used in a liquid crystal display device, a mobile device and the like, in order to reduce the cost, it is desired to form a resin into a film by a melt film-forming method of heat melting and molding the resin without using a solvent, instead of the conventional solution casting film-forming method using a solvent.

However, when the conventional polycarbonate resin using isosorbide and a fluorene compound as raw materials is film-formed by a melt film-forming method, there is a problem that an extraneous matter or an air bubble is generated due to heat during film formation to cause an increase in defects or coloration of the film.

Also, a transparent film used in such a field is sometimes utilized under various temperature or humidity conditions different from those in normal usage and is required to allow its characteristics to be less changed even by an environmental change during use, and among others, temperature-resistant stability of being insusceptible to variation of the retardation due to a temperature change is demanded.

An object of the present invention is to solve the above-described conventional problems and provide a polycarbonate resin ensuring that an increase in defects or coloration of a film resulting from generation of an extraneous matter or an air bubble due to heat during film formation is less likely to occur even in the film formation by a melt film-forming method and at the same time, a transparent film excellent in the temperature-resistant stability and insusceptible to variation of the retardation even when used for a long time under a high-temperature condition can be formed, and a transparent film comprising the polycarbonate resin.

Means for Solving Problem

As a result of many intensive studies to attain the object above, the present inventors have found that the above-described conventional problems can be solved by a polycarbonate resin containing a structural unit derived from a specific hydroxy compound in a specific ratio. The present invention has been accomplished based on this finding.

That is, the gist of the present invention resides in the following [1] to [9].

[1] A polycarbonate resin comprising:

a structural unit derived from a dihydroxy compound represented by the following formula (1), a structural unit derived from a dihydroxy compound represented by the following formula (2), and a structural unit derived from at least one dihydroxy compounds selected from the group consisting of a dihydroxy compound represented by the following formula (3), a dihydroxy compound represented by the following formula (4), a dihydroxy compound represented by the following formula (5) and a dihydroxy compound represented by the following formula (6), wherein:

the content of structural units derived from dihydroxy compounds represented by the following formulae (3) to (6) is from 0.1 wt % to less than 4.5 wt % based on the total of structural units derived from dihydroxy compounds in the polycarbonate resin:

[Chem. 1]

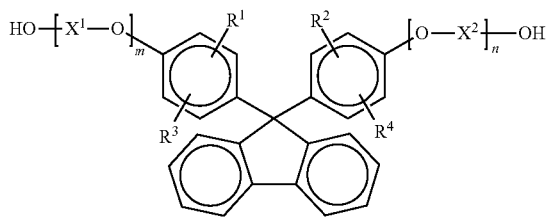

(1)

(in the above formula (1), each of $R^1$ to $R^4$ independently represents a hydrogen atom, a substituted or unsubstituted alkyl group having 1 to 20 carbon atoms, a substituted or unsubstituted cycloalkyl group having 6 to 20 carbon atoms, or a substituted or unsubstituted aryl group having 6 to 20 carbon atoms, each of $X^1$ and $X^2$ independently represents a substituted or unsubstituted alkylene group having 2 to 10 carbon atoms, a substituted or unsubstituted cycloalkylene group having 6 to 20 carbon atoms, or a substituted or unsubstituted arylene group having 6 to 20 carbon atoms, and each of m and n is independently an integer of 0 to 5);

[Chem. 2]

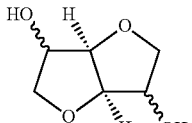

(2)

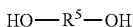

(3)

(in the above formula (3), $R^5$ represents a substituted or unsubstituted cycloalkylene group having 4 to 20 carbon atoms);

(4)

(in the above formula (4), wherein $R^6$ represents a substituted or unsubstituted cycloalkylene group having 4 to 20 carbon atoms);

(5)

(in the above formula (5), $R^7$ represents a substituted or unsubstituted alkylene group having 2 to 10 carbon atoms, and p is an integer of 2 to 50);

(6)

(in the above formula (6), $R^8$ represents a substituted or unsubstituted alkylene group having 2 to 20 carbon atoms, or a group containing a substituted or unsubstituted acetal ring).

[2] The polycarbonate resin as described in the above [1], wherein the polycarbonate resin has a glass transition temperature in the range of 125 to 150° C.

[3] The polycarbonate resin as described in the above [1] or [2], wherein the polycarbonate resin has a melt viscosity at a temperature of 240° C. and a shear rate of 91.2 $sec^{-1}$ in the range of 500 to 2,500 Pa·sec.

[4] The polycarbonate resin as described in any one of the above [1] to [3], wherein the polycarbonate resin has a reduced viscosity in the range of 0.30 to 1.2 dL/g.

[5] A transparent film molded from the polycarbonate resin described in any one of the above [1] to [4].

[6] The transparent film as described in the above [5], which is obtained by molding the polycarbonate resin by a melt film-forming method at a molding temperature of 265° C. or less.

[7] The transparent film as described in the above [6], which is stretched at least in one direction.

[8] The transparent film as described in any one of the above [5] to [7], wherein the ratio of the retardation R450 measured at a wavelength of 450 nm to the retardation R550 measured at a wavelength of 550 nm satisfies the following formula (I):

$$0.5 < R450/R550 < 1.0 \qquad (I)$$

[9] The transparent film as described in the above [8], wherein with respect to the ratio R450/R550 of the retardation R450 to the retardation R550, assuming that the initial R450/R550 is $(R450/R550)_0$ and the R450/R550 after holding at 90° C. for 48 hours is $(R450/R550)_{48}$, the following formula (II) is satisfied:

$$0 < |(R450/R550)_{48} - (R450/R550)_0| < 0.015 \qquad (II)$$

Effects of Invention

The polycarbonate resin of the present invention has excellent suitability for melt film formation, ensuring that even in the film formation by a melt film-forming method, an increase in defects or coloration of a film resulting from generation of an extraneous matter or an air bubble due to heat during film formation is less likely occur.

Moreover, a transparent film obtained by film-forming the polycarbonate resin of the present invention is insusceptible to variation of the retardation even when used for a long time under a high-temperature condition and is excellent in the stability against temperature.

MODE FOR CARRYING OUT INVENTION

The present invention is described in detail below. Incidentally, the present invention is not limited to the following embodiments and can be implemented by making various modifications therein within the scope of its gist.

[1] Polycarbonate Resin

The polycarbonate resin of the present invention is a polycarbonate resin comprising a structural unit derived from a dihydroxy compound represented by the above formula (1), a structural unit derived from a dihydroxy compound represented by the above formula (2), and a structural unit derived from one or more dihydroxy compounds selected from the group consisting of a dihydroxy compound represented by the above formula (3), a dihydroxy compound represented by the above formula (4), a dihydroxy compound represented by the above formula (5) and a dihydroxy compound represented by the above formula (6), wherein the content of a structural unit derived from a dihydroxy compound selected from the above formulae (3) to (6) is from 0.1 wt % to less than 4.5 wt % based on the total of structural units derived from dihydroxy compounds in the polycarbonate resin.

In the following, the carbon number of various groups means the total carbon number including, when the group has a substituent, the carbon number of the substituent.

[Dihydroxy Compound Represented by Formula (1)]

The polycarbonate resin of the present invention contains a structural unit derived from a dihydroxy compound represented by the following formula (1):

[Chem. 3]

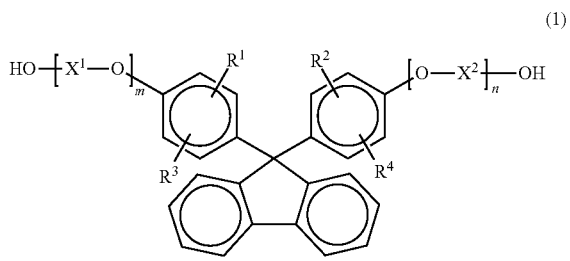

(1)

In the above formula (1), each of $R^1$ to $R^4$ independently represents a hydrogen atom, a substituted or unsubstituted alkyl group having a carbon number of 1 to 20, a substituted or unsubstituted cycloalkyl group having a carbon number of 6 to 20, or a substituted or unsubstituted aryl group having a carbon number of 6 to 20, each of $X^1$ and $X^2$ independently represents a substituted or unsubstituted alkylene group having a carbon number of 2 to 10, a substituted or unsubstituted cycloalkylene group having a carbon number of 6 to 20, or a substituted or unsubstituted arylene group having a carbon number of 6 to 20, and each of m and n is independently an integer of 0 to 5.

Examples of the substituent which may be substituted on $R^1$ to $R^4$, $X^1$ and $X^2$ include an alkoxy group such as methoxy group, ethoxy group and propoxy group, and an aryl group such as phenyl group and naphthyl group.

Each of $R^1$ to $R^4$ is independently preferably a hydrogen atom, a substituted or unsubstituted alkyl group having a carbon number of 1 to 10 or a substituted or unsubstituted aryl group having a carbon number of 6 to 15, and it is more preferred that $R^1$ and $R^2$ out of $R^1$ to $R^4$ are an unsubstituted alkyl group or all of $R^1$ to $R^4$ are a hydrogen atom. In the case where $R^1$ to $R^4$ are a substituent other than a hydrogen atom, the substituent is preferably bonded to the 3- or 5-position with respect to the bonding position of the benzene ring to the fluorene ring, and the unsubstituted alkyl group is preferably a methyl group or an ethyl group.

Each of $X^1$ and $X^2$ is independently preferably an alkylene group having a carbon number of 1 to 4 and among others, preferably an unsubstituted methylene group, an unsubstituted ethylene group or an unsubstituted propylene group, and it is more preferred that $X^1$ and $X^2$ are the same. Also, m and n are preferably the same integer.

In particular, the dihydroxy compound represented by formula (1) preferably has a bilaterally symmetric structure with the axis of symmetry being the axis of symmetry of the fluorene ring.

Specific examples of the dihydroxy compound represented by formula (1) include 9,9-bis(4-hydroxyphenyl)fluorene, 9,9-bis(4-hydroxy-3-methylphenyl)fluorene, 9,9-bis(4-hydroxy-3-ethylphenyl)fluorene, 9,9-bis(4-hydroxy-3-n-propylphenyl)fluorene, 9,9-bis(4-hydroxy-3-isopropylphenyl)fluorene, 9,9-bis(4-hydroxy-3-n-butylphenyl)fluorene, 9,9-bis(4-hydroxy-3-sec-butylphenyl)fluorene, 9,9-bis(4-hydroxy-3-tert-propylphenyl)fluorene, 9,9-bis(4-hydroxy-3-cyclohexylphenyl)fluorene, 9,9-bis(4-hydroxy-3-phenylphenyl)fluorene, 9,9-bis(4-(2-hydroxyethoxy)phenyl)fluorene, 9,9-bis(4-(2-hydroxyethoxy)-3-methylphenyl)fluorene, 9,9-bis(4-(2-hydroxyethoxy)-3-isopropylphenyl)fluorene, 9,9-bis(4-(2-hydroxyethoxy)-3-isobutylphenyl)fluorene, 9,9-bis(4-(2-hydroxyethoxy)-3-tert-butylphenyl)fluorene, 9,9-bis(4-(2-hydroxyethoxy)-3-cyclohexylphenyl)fluorene, 9,9-bis(4-(2-hydroxyethoxy)-3-phenylphenyl)fluorene, 9,9-bis(4-(2-hydroxyethoxy)-3,5-dimethylphenyl)fluorene, 9,9-bis(4-(2-hydroxyethoxy)-3-tert-butyl-6-methylphenyl)fluorene, and 9,9-bis(4-(3-hydroxy-2,2-dimethylpropoxy)phenyl)fluorene, and preferred are 9,9-bis(4-hydroxy-3-methylphenyl)fluorene, 9,9-bis(4-(2-hydroxyethoxy)phenyl)fluorene and 9,9-bis(4-(2-hydroxyethoxy)-3-methylphenyl)fluorene, but the present invention is not limited to these dihydroxy compounds. Among others, the dihydroxy compound represented by formula (1) is preferably 9,9-bis(4-(2-hydroxyethoxy)phenyl)fluorene.

As for the structural unit derived from a dihydroxy compound represented by formula (1), the polycarbonate resin of the present invention may contain only one kind of a structure or may contain two or more kinds of structures.

[Dihydroxy Compound Represented by Formula (2)]

The polycarbonate resin of the present invention contains a structural unit derived from a dihydroxy compound represented by the following formula (2):

[Chem. 4]

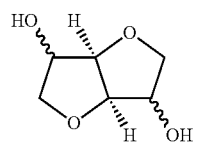

(2)

The dihydroxy compound represented by formula (2) includes, for example, isosorbide, isomannide and isoidide, which are in a stereoisomeric relationship. One of these compounds may be used alone, or two or more thereof may be used in combination. Among these dihydroxy compounds, isosorbide obtained by dehydration condensation of sorbitol produced from various starches existing abundantly as a resource and being easily available is most preferred in view of ease of availability and production, optical characteristics and moldability.

[Dihydroxy Compounds Represented by Formulae (3) to (6)]

The polycarbonate resin of the present invention contains a structural unit derived from one or more dihydroxy compounds selected from the group consisting of a dihydroxy compound represented by the following formula (3), a dihydroxy compound represented by the following formula (4), a dihydroxy compound represented by the following formula (5) and a dihydroxy compound represented by the following formula (6).

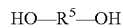

(3)

(In the above formula (3), $R^5$ represents a substituted or unsubstituted cycloalkylene group having a carbon number of 4 to 20).

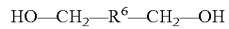

(4)

(In the above formula (4), $R^6$ represents a substituted or unsubstituted cycloalkylene group having a carbon number of 4 to 20).

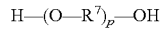

(5)

(In the above formula (5), $R^7$ represents a substituted or unsubstituted alkylene group having a carbon number of 2 to 10, and p is an integer of 2 to 50).

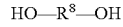

(6)

(In the above formula (6) $R^8$ represents a substituted or unsubstituted alkylene group having a carbon number of 2 to 20, or a group containing a substituted or unsubstituted acetal ring).

<Dihydroxy Compound Represented by Formula (3)>

The dihydroxy compound represented by formula (3) is an alicyclic dihydroxy compound having on $R^5$ a substituted or unsubstituted cycloalkylene group having a carbon number of 4 to 20, preferably a carbon number of 4 to 18. Here, in the case where $R^5$ has a substituent, the substituent includes a substituted or unsubstituted alkyl group having a carbon number of 1 to 12, and in the case where this alkyl group has a substituent, examples of the substituent include an alkoxy group such as methoxy group, ethoxy group and propoxy group, and an aryl group such as phenyl group and naphthyl group.

This dihydroxy compound has a ring structure, whereby the toughness of a molded article when the obtained polycarbonate resin is molded, particularly, the toughness when molded into a film, can be enhanced.

The cycloalkylene group of $R^5$ is not particularly limited as long as it is a hydrocarbon group having a ring structure, and the structure may be a bridged structure having a bridgehead carbon atom. From the standpoint that production of a dihydroxy compound is easy and the amount of impurities can be reduced, the dihydroxy compound represented by formula (3) is preferably a compound containing a 5-membered ring structure or a 6-membered ring structure, that is, a dihydroxy compound where $R^5$ is a substituted or unsubstituted cyclopentylene group or a substituted or unsubstituted cyclohexylene group. When the dihydroxy compound is such a dihydroxy compound, by virtue of containing a 5-membered ring structure or a 6-membered ring structure, the heat resistance of the polycarbonate resin obtained can be increased. The 6-membered ring structure may be fixed in a chair or boat form by covalent bonding.

Above all, in the dihydroxy compound represented by formula (3), $R^5$ is preferably a variety of isomers represented by the following formula (7). Here, in formula (7), $R^{11}$ represents a hydrogen atom or a substituted or unsubstituted alkyl group having a carbon number of 1 to 12. When $R^{11}$ is an alkyl group having a carbon number of 1 to 12 and having a substituent, examples of the substituent include an alkoxy group such as methoxy group, ethoxy group and propoxy group, and an aryl group such as phenyl group and naphthyl group.

[Chem. 5]

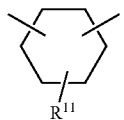

(7)

More specific examples of the dihydroxy compound represented by formula (3) include, but are not limited to, tetramethylcyclobutanediol, 1,2-cyclopentanediol, 1,3-cyclopentanediol, 1,2-cyclohexanediol, 1,3-cyclohexanediol, 1,4-cyclohexanediol, 2-methyl-1,4-cyclohexanediol, tricyclodecanediols, and pentacyclodiols, One of these compounds may be used alone, or two or more thereof may be used in combination.

<Dihydroxy Compound Represented by Formula (4)>

The dihydroxy compound represented by formula (4) is an alicyclic dihydroxy compound having on $R^6$ a substituted or unsubstituted cycloalkylene group having a carbon number of 4 to 20, preferably a carbon number of 3 to 18. Here, in the case where $R^6$ has a substituent, the substituent includes a substituted or unsubstituted alkyl group having a carbon number of 1 to 12, and in the case where this alkyl group has a substituent, examples of the substituent include an alkoxy group such as methoxy group, ethoxy group and propoxy group, and an aryl group such as phenyl group and naphthyl group.

This dihydroxy compound has a ring structure, whereby the toughness of a molded article when the obtained polycarbonate resin is molded, particularly, the toughness when molded into a film, can be enhanced.

The cycloalkylene group of $R^6$ is not particularly limited as long as it is a hydrocarbon group having a ring structure, and the structure may be a bridged structure having a bridgehead carbon atom. From the standpoint that production of a dihydroxy compound is easy and the amount of impurities can be reduced, the dihydroxy compound represented by formula (4) is preferably a compound containing a 5-membered ring structure or a 6-membered ring structure, that is, a dihydroxy compound where $R^6$ is a substituted or unsubstituted cyclopentylene group or a substituted or unsubstituted cyclohexylene group. When the dihydroxy compound is such a dihydroxy compound, by virtue of containing a 5-membered ring structure or a 6-membered ring structure, the heat resistance of the polycarbonate resin obtained can be increased. The 6-membered ring structure may be fixed in a chair or boat form by covalent bonding. Above all, in the dihydroxy compound represented by formula (4), $R^6$ is preferably a variety of isomers represented by formula (7).

More specific examples of the dihydroxy compound represented by formula (4) include, but are not limited to, 1,2-cyclohexanedimethanol, 1,3-cyclohexanedimethanol, 1,4-cyclohexanedimethanol, 3,8-bis(hydroxymethyl)tricyclo[5.2.1.0$^{2.6}$]decane, 3,9-bis(hydroxymethyl)tricyclo[5.2.1.0$^{2.6}$]decane, 4,8-bis(hydroxymethyl)tricyclo[5.2.1.0$^{2.6}$]decane, 4,9-bis(hydroxymethyl)tricyclo[5.2.1.0$^{2.6}$]decane, 8-hydroxy-3-hydroxymethyltricyclo[5.2.1.0$^{2.6}$]decane, 9-hydroxy-3-hydroxymethyltricyclo[5.2.1.0$^{2.6}$]decane, 8-hydroxy-4-hydroxymethyltricyclo[5.2.1.0$^{2.6}$]decane, and 9-hydroxy-4-hydroxymethyltricyclo[5.2.1.0$^{2.6}$]decane.

One of these compounds may be used alone, or two or more thereof may be used in combination. That is, these compounds are sometimes obtained as a mixture of isomers due to the production process and in this case, the isomeric mixture can be used as it is. For example, a mixture of 3,8-bis(hydroxymethyl)tricyclo[5.2.1.0$^{2.6}$]decane, 3,9-bis(hydroxymethyl)tricyclo[5.2.1.0$^{2.6}$]decane, 4,8-bis(hydroxymethyl)tricyclo[5.2.1.0$^{2.6}$]decane and 4,9-bis(hydroxymethyl)tricyclo[5.2.1.0$^{2.6}$]decane can be used.

Among specific examples of the dihydroxy compound represented by formula (4), cyclohexanedimethanols are preferred, and in view of availability and ease of handling, 1,4-hexanedimethanol, 1,3-cyclohexanedimethanol and 1,2-cyclohexanedimethanol are preferred.

<Dihydroxy Compound Represented by Formula (5)>

The dihydroxy compound represented by formula (5) is a compound having on $R^7$ a substituted or unsubstituted cycloalkylene group having a carbon number of 2 to 10, preferably a carbon number of 2 to 5. p is an integer of 2 to 50, preferably an integer of 2 to 30, more preferably an integer of 5 to 28, still more preferably an integer of 10 to 25, yet still more preferably an integer of 10 to 15.

Specific examples of the dihydroxy compound represented by formula (5) include, but are not limited to, diethylene glycol, triethylene glycol, and a polyethylene glycol (having a molecular weight of 150 to 4,000). The dihydroxy compound represented by formula (5) is preferably a polyethylene glycol having a molecular weight of 300 to 2,000, more preferably a polyethylene glycol having a number of molecule of 600 to 1,500.

One of these compounds may be used alone, or two or more thereof may be used in combination.

<Dihydroxy Compound Represented by Formula (6)>

The dihydroxy compound represented by formula (6) is a dihydroxy compound having on $R^8$ a substituted or unsubstituted alkylene group having a carbon number of 2 to 20, preferably a carbon number of 2 to 10, or a group containing a substituted or unsubstituted acetal ring. In the case where the alkylene group of $R^8$ has a substituent, the substituent includes an alkyl group having a carbon number of 1 to 5. Also, when the group containing an acetal ring of $R^8$ has a substituent, the substituent includes an alkyl group having a carbon number of 1 to 3.

Out of dihydroxy compounds represented by formula (6), examples of the dihydroxy compound where $R^8$ is a substituted or unsubstituted alkylene group having a carbon number of 2 to 20 include, but are not limited to, 1,3-propanediol, 1,4-butanediol and 1,6-hexanediol.

On the other hand, the dihydroxy compound where $R^8$ is a group containing a substituted or unsubstituted acetal ring is not particularly limited but, among others, is preferably a dihydroxy compound having a spiro structure represented by the following formula (8) or (9), more preferably a dihydroxy compound having a plurality of ring structures represented by the following formula (8).

[Chem. 6]

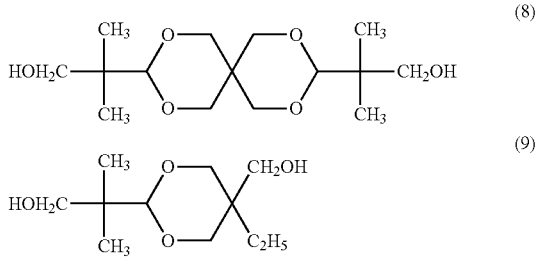

Among these dihydroxy compounds, in view of availability, ease of handling, high reactivity during polymerization, and hue of the obtained polycarbonate resin, 1,3-propanediol and 1,6-hexanediol are preferred. Also, in view of heat resistance, dihydroxy compounds having a group containing an acetal ring are preferred, and a compound having a plurality of ring structures typified by formula (8) is more preferred. According to the performance required of the polycarbonate resin obtained, one of these compounds may be used alone, or two or more thereof may be used in combination.

[Other Dihydroxy Compounds]

In addition to the structural units derived from dihydroxy compounds represented by formulae (1) to (6), the polycarbonate resin composition may further contain structural units derived from other dihydroxy compounds.

Other dihydroxy compounds include, for example, bisphenols.

Examples of the bisphenols include 2,2-bis(4-hydroxyphenyl)propane (=bisphenol A), 2,2-bis(4-hydroxy-3,5-dimethylphenyl)propane, 2,2-bis(4-hydroxy-3,5-diethylphenyl)propane, 2,2-bis(4-hydroxy-(3,5-diphenyl)phenyl)propane, 2,2-bis(4-hydroxy-3,5-dibromophenyl)propane, 2,2-bis(4-hydroxyphenyl)pentane, 2,4'-dihydroxy-diphenylmethane, bis(4-hydroxyphenyl)methane, bis(4-hydroxy-5-nitrophenyl)methane, 1,1-bis(4-hydroxyphenyl)ethane, 3,3-bis(4-hydroxyphenyl)pentane, 1,1-bis(4-hydroxyphenyl)cyclohexane, bis(4-hydroxyphenyl)sulfone, 2,4'-dihydroxydiphenylsulfone, bis(4-hydroxyphenyl)sulfide, 4,4'-dihydroxydiphenyl ether, 4,4'-dihydroxy-3,3'-dichlorodiphenyl ether, and 4,4'-dihydroxy-2,5-diethoxydiphenyl ether.

One of these compounds may be used alone, or two or more thereof may be used in combination. However, a dihydroxy compound containing an aromatic ring in the structure, other than those represented by formula (1), may adversely affect the optical characteristics and therefore, a structural unit derived from such a dihydroxy compound is preferably used in a ratio of 50 mol % or less, more preferably 20 mol % or less, still more preferably 5 mol % or less, based on the total of structural units derived from dihydroxy compounds in the polycarbonate resin. In particular, it is preferred that the polycarbonate resin of the present invention does not contain a structural unit derived from a dihydroxy compound containing an aromatic ring in the structure, other than those represented by formula (1).

[Content of Structural Unit Derived from Dihydroxy Compound]

The polycarbonate resin of the present invention is characterized by containing structural units derived from one or more dihydroxy compounds selected from the group consisting of a dihydroxy compound represented by formula (3), a dihydroxy compound represented by formula (4), a dihydroxy compound represented by formula (5) and a dihydroxy compound represented by formula (6), in a ratio of 0.1 wt % to less than 4.5 wt %, preferably from 0.1 to 4.0 wt %, more preferably from 0.2 to 3.0 wt %, based on the total of structural units derived from dihydroxy compounds in the polycarbonate resin. Because, by containing a structural unit derived from a dihydroxy compound represented by formulae (3) to (6) in a ratio of not less than the lower limit above, generation of an extraneous matter or an air bubble due to heat or coloration of the polycarbonate resin can be prevented from occurring at the time of melting and molding the polycarbonate resin. However, if the content of the structural unit is excessively large, stability of the retardation when molded into a film is reduced and therefore, the ratio is less than the upper limit above.

Incidentally, out of structural units derived from dihydroxy compounds represented by formulae (3) to (6), the polycarbonate resin of the present invention may contain only a structural unit derived from a dihydroxy compound represented by any one formula or may contain structural units derived from dihydroxy compounds represented by two or more formulae. The dihydroxy compound from which the structural unit contained is derived is appropriately determined to satisfy the required characteristics according to use of the polycarbonate resin, but it is preferred to contain, among others, a structural unit derived from a dihydroxy compound represented by formula (5), preferably a polyethylene glycol having a molecular weight of 300 to 2,000, more preferably a polyethylene glycol having a molecular weight of 600 to 1,500, in a ratio of 0.5 to 4 wt %, particularly from 1 to 3 wt %, based on the total of structural units derived from dihydroxy compounds in the polycarbonate resin.

In the polycarbonate resin of the present invention, the content of the structural unit derived from a dihydroxy compound represented by formula (1) is preferably 40 wt % or more, more preferably 45 wt % or more, still more preferably 50 wt % or more, yet still more preferably 55 wt % or more, even yet still more preferably 60 wt % or more, based on the total of structural units derived from dihydroxy compounds contained in the polycarbonate resin. If the content of this structural unit is too small, preferred wavelength dispersion characteristics in using the polycarbonate resin of the present invention as an optical film may not be obtained. Also, if the content of the structural unit above is excessively large, in using the polycarbonate resin of the present invention as an optical film, the ratio between the retardation measured at a wavelength of 450 nm and the retardation measured at a wavelength of 550 nm becomes too large, resulting in undesirable optical characteristics, and therefore, the content is preferably 95 wt % or less, more preferably 90 wt % or less, still more preferably 85 wt % or less, yet still more preferably 80 wt % or less.

In the polycarbonate resin of the present invention, the content of the structural unit derived from a dihydroxy compound represented by formula (2) is preferably 20 wt % or more, more preferably 25 wt % or more, still more preferably 30 wt % or more, based on the total of structural units derived from dihydroxy compounds contained in the polycarbonate resin. If the content of this structural unit is too small, in using the polycarbonate resin as an optical film, the retardation of the film may become too small. However, if the content of the structural unit above is excessively large, the glass transition temperature of the polycarbonate resin of the present invention becomes too high, making film molding difficult, and therefore, the content is preferably 50 wt % or less, more preferably 45 wt % or less.

[Production Method of Polycarbonate Resin]

The polycarbonate resin of the present invention can be produced by a polymerization method in general use. The polymerization method may be either method of a solution polymerization method using phosgene and a melt polymerization method using a reaction with a carbonic acid diester but is preferably a melt polymerization method where a dihydroxy compound represented by formula (1), a dihydroxy compound represented by formula (2), one or more dihydroxy compounds selected from the group consisting of a dihydroxy compound represented by formula (3), a dihydroxy compound represented by formula (4), a dihydroxy compound represented by formula (5) and a dihydroxy compound represented by formula (6), and other dihydroxy compounds used, if desired, are reacted with a carbonic acid diester in the presence of a polymerization catalyst.

The carbonic acid diester used in this melt polymerization method includes usually a carbonic acid ester represented by the following formula (10):

[Chem. 7]

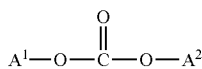

(10)

(wherein each of $A^1$ and $A^2$ is independently a substituted or unsubstituted aliphatic group having a carbon number of 1 to 18 or a substituted or unsubstituted aromatic group having a carbon number of 6 to 18).

The carbonic acid diester represented by formula (10) includes, for example, diaryl carbonates typified by diphenyl carbonate, ditolyl carbonate, bis(chlorophenyl)carbonate, m-cresyl carbonate, dinaphthyl carbonate and bis(biphenyl) carbonate, and dialkyl carbonates typified by dimethyl carbonate, diethyl carbonate, dibutyl carbonate and dicyclohexyl carbonate. Among these, diaryl carbonates are preferably used, and diphenyl carbonate is more preferably used.

One of these carbonic acid diesters may be used alone, or two or more thereof may be mixed and used.

The carbonic acid diester is preferably used in a molar ratio of 0.90 to 1.10, more preferably in a molar ratio of 0.96 to 1.04, based on all dihydroxy compounds used for the reaction. If this molar ratio is less than 0.90, the terminal hydroxyl group of the produced polycarbonate resin may be increased, as a result, the thermal stability of the polymer may be deteriorated or a desired high molecular weight product may not be obtained. Also, if this molar ratio exceeds 1.10, not only the transesterification reaction rate may be reduced under the same conditions or production of a polycarbonate having a desired molecular weight may become difficult but also the amount of the carbonic acid diester remaining in the polycarbonate resin produced may be increased and the remaining carbonic acid diester may disadvantageously give rise to an odor during molding or of a molded article.

As the polymerization catalyst (transesterification catalyst) in the melt polymerization, an alkali metal compound and/or an alkaline earth metal compound are used. Together with an alkali metal compound and/or an alkaline earth metal compound, a basic compound such as basic boron compound, basic phosphorus compound, basic ammonium compound and amine-based compound may be secondarily used in combination, but it is particularly preferred to use only an alkali metal compound and/or an alkaline earth metal compound.

Examples of the alkali metal compound used as the polymerization catalyst include sodium hydroxide, potassium hydroxide, lithium hydroxide, cesium hydroxide, sodium hydrogencarbonate, potassium hydrogencarbonate, lithium hydrogencarbonate, cesium hydrogencarbonate, sodium carbonate, potassium carbonate, lithium carbonate, cesium carbonate, sodium acetate, potassium acetate, lithium acetate, cesium acetate, sodium stearate, potassium stearate, lithium stearate, cesium stearate, sodium borohydride, potassium borohydride, lithium borohydride, cesium borohydride, sodium borophenylate, potassium borophenylate, lithium borophenylate, cesium borophenylate, sodium benzoate, potassium benzoate, lithium benzoate, cesium benzoate, disodium hydrogenphosphate, dipotassium hydrogenphosphate, dilithium hydrogenphosphate, dicesium hydrogenphosphate, disodium phenylphosphate, dipotassium phenylphosphate, dilithium phenylphosphate, dicesium phenylphosphate, alcoholates and phenolates of sodium, potassium, lithium and cesium, and disodium, dipotassium, dilithium and dicesium salts of bisphenol A.

Examples of the alkaline earth metal compound include calcium hydroxide, barium hydroxide, magnesium hydroxide, strontium hydroxide, calcium hydrogencarbonate, barium hydrogencarbonate, magnesium hydrogencarbonate, strontium hydrogencarbonate, calcium carbonate, barium carbonate, magnesium carbonate, strontium carbonate, calcium acetate, barium acetate, magnesium acetate, strontium acetate, calcium stearate, barium stearate, magnesium stearate, and strontium stearate. Incidentally, in the description of the present invention, the terms "alkali metal" and "alkaline earth metal" are used to have the same meanings as "Group 1 element" and "Group 2 element", respectively, in the long-form periodic table (Nomenclature of Inorganic Chemistry IUPAC Recommendations 2005).

One of these alkali metal compounds and/or alkaline earth metal compounds may be used alone, or two or more thereof may be used in combination.

Specific examples of the basic boron compound used in combination with an alkali metal compound and/or an alkaline earth metal compound include the sodium salts, potassium salts, lithium salts, calcium salts, barium salts, magnesium salts or strontium salts of tetramethylboron, tetraethylboron, tetrapropylboron, tetrabutylboron, trimethylethylboron, trimethylbenzylboron, trimethylphenylboron, triethylmethylboron, triethylbenzylboron, triethylphenylboron, tributylbenzylboron, tributylphenylboron, tetraphenylboron, benzyltriphenylboron, methyltriphenylboron and butyltriphenylboron.

Examples of the basic phosphorus compound include triethylphosphine, tri-n-propylphosphine, triisopropylphosphine, tri-n-butylphosphine, triphenylphosphine, tributylphosphine, and a quaternary phosphonium salt.

Examples of the basic ammonium compound include tetramethylammonium hydroxide, tetraethylammonium hydroxide, tetrapropylammonium hydroxide, tetrabutylammonium hydroxide, trimethylethylammonium hydroxide, trimethylbenzylammonium hydroxide, trimethylphenylammonium hydroxide, triethylmethylammonium hydroxide, triethylbenzylammonium hydroxide, triethylphenylammonium hydroxide, tributylbenzylammonium hydroxide, tributylphenylammonium hydroxide, tetraphenylammonium hydroxide, benzyltriphenylammonium hydroxide, methyltriphenylammonium hydroxide, and butyltriphenylammonium hydroxide.

Examples of the amine-based compound include 4-aminopyridine, 2-aminopyridine, N,N-dimethyl-4-aminopyridine, 4-diethylaminopyridine, 2-hydroxypyridine, 2-methoxypyridine, 4-methoxypyridine, 2-dimethylaminoimidazole, 2-methoxyimidazole, imidazole, 2-mercaptoimidazole, 2-methylimidazole, and aminoquinoline.

One of these basic compounds may be used alone, or two or more thereof may be used in combination.

In the case of using an alkali metal compound and/or an alkaline earth metal compound, the amount of the polymerization catalyst used is, as the amount in terms of metal, usually from 0.1 to 100 µmol, preferably from 0.5 to 50 µmol, still more preferably from 1 to per mol of all dihydroxy compounds used for the reaction. If the amount of the polymerization catalyst used is too small, polymerization activity necessary for producing a polycarbonate resin having a desired molecular weight my not be obtained, whereas if the amount of the polymerization catalyst used is too large, the hue of the polycarbonate resin obtained may be deteriorated or a byproduct may be produced to increase occurrence of flowability reduction or gel generation, making it difficult to produce a polycarbonate having a target quality.

In producing the polycarbonate resin of the present invention, the dihydroxy compound represented by formula (1) may be fed as a solid, may be heated and fed in a molten state, or may be fed in the form of an aqueous solution.

Furthermore, the dihydroxy compound represented by formula (2) or each of one or more dihydroxy compounds selected from the group consisting of a dihydroxy compound represented by formula (3), a dihydroxy compound represented by formula (4), a dihydroxy compound represented by formula (5) and a dihydroxy compound represented by formula (6) may be fed as a solid, may be heated and fed in a molten state, or if soluble in water, may be fed in the form of an aqueous solution. The same applies to other dihydroxy compounds.

In the present invention, the method for reacting a dihydroxy compound represented by formula (1), a dihydroxy compound represented by formula (2), one or more dihydroxy compounds selected from the group consisting of a dihydroxy compound represented by formula (3), a dihydroxy compound represented by formula (4), a dihydroxy compound represented by formula (5) and a dihydroxy compound represented by formula (6), and other dihydroxy compounds used, if desired, with a carbonic acid diester in the presence of a polymerization catalyst is usually performed by a multistage process consisting of two or more stages. Specifically, the reaction in the first stage is performed at a temperature of 140 to 220° C., preferably from 150 to 200° C., for 0.1 to 10 hours, preferably from 0.5 to 3 hours. In the second and subsequent stages, the reaction temperature is raised while gradually reducing the pressure in the reaction system from the pressure in the first stage, and a polycondensation reaction is preformed at a temperature of 210 to 280° C. under a final pressure in the reaction system of 200 Pa or less while removing a concurrently occurring monohydroxy compound such as phenol out of the system.

In reducing the pressure during the polycondensation reaction, it is important to control the balance between the temperature and the pressure in the reaction system. In particular, when either one of the temperature and the pressure is too early changed, an unreacted monomer may be distilled out of the reaction system to change the molar ratio between the dihydroxy compound and the carbonic acid diester, and the polymerization rate may be reduced. For example, in the case of using a dihydroxy compound represented by formula (1), isosorbide as a dihydroxy compound represented by formula (2), and 1,4-cyclohexanedimethanol as a alicyclic dihydroxy compound represented by formula (4), the 1,4-cyclohexane dimethanol still as a monomer is likely to distill out of the reaction system. Therefore, it is preferred to perform a reaction by setting the pressure in the reaction system to a reduced pressure of about 13 kPa while raising the temperature at a temperature rise rate of 40° C. or less per hour and after further raising the temperature at a temperature rise rate of 40° C. or less per hour under a pressure up to about 6.67 kPa, perform a polycondensation reaction at a temperature of 200 to 250° C. finally under a pressure of 200 Pa or less, because a polycarbonate resin sufficiently increased in the polymerization degree is obtained.

The mode of reaction may be any of a batch system, a continuous system, and a combination of a batch system and a continuous system.

At the time of producing the polycarbonate resin of the present invention by a melt polymerization method, a phosphate compound, a phosphite compound or a metal salt thereof may be added during polymerization for the purpose of preventing coloration.

As the phosphate compound, one member or two or more members of trialkyl phosphates such as trimethyl phosphate and triethyl phosphate are suitably used. Such a compound is preferably added in a ratio of 0.0001 to 0.005 mol %, more preferably from 0.0003 to 0.003 mol %, based on all dihydroxy compounds used for reaction. If the amount of the phosphate compound added is less than the lower limit above, the effect of preventing coloration may be small, whereas if the amount added exceeds the upper limit, this may give rise to increase in the haze, acceleration of the coloration, or reduction in the heat resistance.

In the case of adding a phosphite compound, a thermal stabilizer recited below may be arbitrarily selected and used. Among others, one member or two or more members of trimethyl phosphite, triethyl phosphite, trisnonylphenyl phosphite, trimethyl phosphate, tris(2,4-di-tert-butylphenyl) phosphite and bis(2,4-di-tert-butylphenyl)pentaerythritol diphosphite can be suitably used. Such a phosphite compound is preferably added in a ratio of 0.0001 to 0.005 mol %, more preferably from 0.0003 to 0.003 mol %, based on all dihydroxy compounds used for reaction. If the amount of the phosphite compound added is less than the lower limit above, the effect of preventing coloration may be small, whereas if the amount added exceeds the upper limit, this may give rise to increase in the haze, acceleration of the coloration, or reduction in the heat resistance.

A phosphate compound and a phosphite compound or a metal salt thereof may be added in combination, and in this case, the amount added is, as the total amount of a phosphate compound and a phosphite compound or a metal salt thereof, preferably from 0.0001 to 0.005 mol %, more preferably from 0.0003 to 0.003 mol %, based on all dihydroxy compounds described above. If the amount added is less than the lower limit above, the effect of preventing coloration may be small, whereas if the amount added exceeds the upper limit, this may give rise to increase in the haze, acceleration of the coloration, or reduction in the heat resistance.

Incidentally, the metal salt of a phosphate compound or a phosphite compound is preferably an alkali metal salt or zinc salt of the compound, more preferably a zinc salt. Among zinc phosphates, a zinc long-chain alkylphosphate is preferred.

In the thus-produced polycarbonate resin of the present invention, a thermal stabilizer may be blended so as to prevent reduction in the molecular weight or worsening of the hue at the molding or the like.

Examples of the thermal stabilizer include a phosphorous acid, a phosphoric acid, a phosphonous acid, a phosphonic acid, and an ester thereof. Specific examples thereof include triphenyl phosphite, tris(nonylphenyl)phosphite, tris(2,4-di-tert-butylphenyl)phosphite, tridecyl phosphite, trioctyl phosphite, trioctadecyl phosphite, didecylmonophenyl phosphite, dioctylmonophenyl phosphite, diisopropylmonophenyl phosphite, monobutyldiphenyl phosphite, monodecyldiphenyl phosphite, monooctyldiphenyl phosphite, bis(2,6-di-tert-butyl-4-methylphenyl)pentaerythritol diphosphite, 2,2-methylenebis(4,6-di-tert-butylphenyl)octyl phosphite, bis(nonylphenyl)pentaerythritol diphosphite, bis(2,4-di-tert-butylphenyl)pentaerythritol diphosphite, distearylpentaerythritol diphosphite, tributyl phosphate, triethyl phosphate, trimethyl phosphate, triphenyl phosphate, diphenylmonoorthoxenyl phosphate, dibutyl phosphate, dioctyl phosphate, diisopropyl phosphate, tetrakis(2,4-di-tert-butylphenyl) 4,4'-biphenylenediphosphinate, dimethyl benzenephosphonate, diethyl benzenephosphonate, and dipropyl benzenephosphonate. Among these, preferred are tris-nonylphenyl phosphite, trimethyl phosphate, tris(2,4-di-tert-butylphenyl)phosphite, bis(2,4-di-tert-butylphenyl)pentaerythritol diphosphite, bis(2,6-di-tert-butyl-4-methylphenyl)pentaerythritol diphosphite, and dimethyl benzenephosphonate.

One of these thermal stabilizers may be used alone, or two or more thereof may be used in combination.

The thermal stabilizer may be further additionally blended in addition to the amount added at the melt polymerization. More specifically, when a polycarbonate copolymer is obtained by blending an appropriate amount of a phosphite compound or phosphate compound and thereafter, a phosphite compound is further blended, a large amount of a heat stabilizer can be blended while avoiding increase in the haze, coloration and reduction in the heat resistance at the polymerization, and deterioration of the hue can be prevented.

The blending amount of the thermal stabilizer is preferably from 0.0001 to 1 part by weight, more preferably from 0.0005 to 0.5 parts by weight, still more preferably from 0.001 to 0.2 parts by weight, per 100 parts by weight of the polycarbonate resin.

In the polycarbonate resin of the present invention, a conventionally known antioxidant may be also blended for the purpose of preventing oxidation.

The antioxidant includes, for example, one member or two or more members of pentaerythritol tetrakis(3-mercaptopropionate), pentaerythritol tetrakis(3-laurylthiopropionate), glycerol-3-stearylthiopropionate, triethylene glycol-bis([3-(3-tert-butyl-5-methyl-4-hydroxyphenyl)propionate], 1,6-hexanediol-bis[3-(3,5-di-tert-butyl-4-hydroxyphenyl)propionate], pentaerythritol-tetrakis[3-(3,5-di-tert-butyl-4-hydroxyphenyl)propionate], octadecyl-3-(3,5-di-tert-butyl-4-hydroxyphenyl)propionate, 1,3,5-trimethyl-2,4,6-tris(3,5-di-tert-butyl-4-hydroxybenzyl)benzene, N,N-hexamethylene-bis(3,5-di-tert-butyl-4-hydroxy-hydrocinnamide), 3,5-di-tert-butyl-4-hydroxybenzylphosphonate-diethyl ester, tris(3,5-di-tert-butyl-4-hydroxybenzyl)isocyanurate, tetrakis(2,4-di-tert-butylphenyl)-4,4'-biphenylenediphosphinate, and 3,9-bis{1,1-dimethyl-2-[β-(3-tert-butyl-4-hydroxy-5-methylphenyl)propionyloxy]ethyl}-2,4,8,10-tetraoxaspiro(5,5)undecane.

The blending amount of the antioxidant is preferably from 0.0001 to 0.5 parts by weight per 100 parts by weight of the polycarbonate.

[Physical Properties of Polycarbonate Resin]

<Glass Transition Temperature>

The glass transition temperature of the polycarbonate resin of the present invention is preferably from 125 to 150° C., more preferably from 130 to 145° C. If the glass transition temperature is too low, the heat resistance tends to be worsened, leaving the possibility of causing a dimensional change after film molding, or when the film is laminated as a retardation film to a polarizing plate, the image quality may be reduced. If the glass transition temperature is too high, the melt molding stability at the film molding may be worsened or the transparency of the film may be impaired.

The glass transition temperature of the polycarbonate resin of the present invention is measured by the method described in Examples later.

<Reduced Viscosity>

The molecular weight of the polycarbonate resin of the present invention can be expressed by the reduced viscosity. The reduced viscosity of the polycarbonate resin of the present invention is determined, as described in Examples later, by precisely adjusting the polycarbonate resin concentration to 0.6 g/dL with use of methylene chloride as a solvent and measuring the viscosity by means of an Ubbelohde viscosity tube at a temperature of 20.0° C.±0.1° C. The reduced viscosity of the polycarbonate resin of the present invention is not particularly limited but is preferably 0.30 dL/g or more, more preferably 0.35 dL/g or more. The upper limit of the reduced viscosity is preferably 1.20 dL/g or less, more preferably 1.00 dL/g or less, still more preferably 0.80 dL/g or less.

If the reduced viscosity of the polycarbonate resin is less than the lower limit above, there may arise a problem that the mechanical strength of the molded article is reduced. On the other hand, if the reduced viscosity exceeds the upper limit, this may cause a problem that the flowability at the molding is reduced and in turn, the productivity is lowered, or there may be a possibility that an extraneous matter or the like in the polycarbonate resin can be hardly removed by filtration, making it difficult to reduce an extraneous matter, or an air bubble is mixed at the molding to deteriorate the quality of the molded article.

<Melt Viscosity>

The melt viscosity at a temperature of 240° C. and a shear rate of 91.2 $sec^{-1}$ of the polycarbonate resin of the present invention is preferably from 500 to 2,500 Pa·sec, more preferably from 800 to 2,300 Pa·sec, still more preferably from 900 to 2,000 Pa·sec.

If the melt viscosity of the polycarbonate resin is less than the lower limit above, there may arise a problem that the mechanical strength of the molded article becomes low. On the other hand, if the melt viscosity exceeds the upper limit, there may be a possibility of causing a problem that the flowability at the molding is reduced and in turn, the productivity is lowered, or causing a problem that an air bubble is mixed in the molded article at the molding to deteriorate the outer appearance of the molded article or an extraneous matter in the polycarbonate resin can be hardly removed by filtration or the like. The melt viscosity of the polycarbonate resin is measured by the method described in Examples later.

<Photoelastic Coefficient>

With respect to a sheet obtained by press-molding the polycarbonate resin by the method described in Examples later, the photoelastic coefficient measured by the later-described method is preferably $60 \times 10^{-12}$ $Pa^{-1}$ or less, more preferably $55 \times 10^{-12}$ $Pa^{-1}$ or less, still more preferably $45 \times 10^{-12}$ $Pa^{-1}$ or less, yet still more preferably $35 \times 10^{-12}$ $Pa^{-1}$ or less. If the photoelastic coefficient exceeds $60 \times 10^{-12}$ $Pa^{-1}$, there arises a problem that when a transparent film obtained by molding the polycarbonate resin is laminated as a retardation film to a polarizing plate and the polarizing plate is mounted in a display device, the stress at the lamination leads to imposing a local stress on the retardation film due to viewing environment or heat of backlight to produce a non-uniform retardation change, as a result, the image quality is seriously reduced. Also, in view of ease of production, the photoelastic coefficient is usually $-10 \times 10^{-12}$ $Pa^{-1}$ or more, preferably $0 \times 10^{-12}$ $Pa^{-1}$ or more.

[2] Transparent Film

The transparent film of the present invention is obtained by molding the polycarbonate resin of the present invention.

[Production Method of Transparent Film]

In the present invention, as the method for producing a transparent film by using the polycarbonate resin, various film-forming methods including, for example, a melt extrusion method (melt film-forming method) such as T-die molding method, inflation molding method and cast coating method, a calender molding method, a heat press method, a co-extrusion method, a co-melting method and a multilayer extrusion method can be used, and the method is not particularly limited but is preferably a melt film-forming method, more preferably a T-die molding method or an inflation molding method.

The transparent film of the present invention is stretched at least in one direction and thereby can be used as a retardation plate. The method for stretching includes, for example, various stretching methods such as free-end stretching, fixed-end stretching, free-end shrinkage and fixed-end shrinkage, and one of such methods can be used alone, or these methods may be used simultaneously or successively.

The stretching direction is also not particularly limited, and the stretching can be performed in various directions or dimensions such as horizontal direction, vertical direction, thickness direction or diagonal direction.

The stretching temperature can be also appropriately set according to the stretching method, film thickness and desired retardation in the range of glass transition temperature of polycarbonate resin±20° C.

<Film-Forming Method of Transparent Film>

In the case of molding the transparent film of the present invention by a melt film-forming method, more specifically, for example, the molding temperature is preferably 265° C. or less, more preferably 260° C. or less, still more preferably 258° C. or less. If the molding temperature is too high, this may cause an increase in defects due to an extraneous matter in the transparent film or generation of an air bubble or may lead to coloration of the transparent film. However, if the molding temperature is too low, it may become difficult to mold a transparent film and produce a transparent film having a uniform thickness. Therefore, the lower limit of the molding temperature is usually 200° C. or more, preferably 210° C. or more, more preferably 220° C. or more.

Here, the molding temperature of the transparent film means a temperature at the molding in a melt film-forming method and usually indicates a value obtained by measuring the temperature at the die outlet from which the molten resin is extruded.

<Stretching Method>

The transparent film of the present invention is preferably stretched at least in one direction as described above. As the method for stretching the transparent film, an arbitrary appropriate stretching method is employed according to the purpose, and one of various stretching methods such as free-end stretching, fixed-end stretching, free-end shrinkage and fixed-end shrinkage may be used alone, or these methods may be used simultaneously or successively. Preferred methods are, for example, a transverse uniaxial stretching method, a longitudinal and transverse simultaneous biaxial stretching method, and a longitudinal and transverse successive biaxial stretching method. As the stretching device, an arbitrary appropriate stretching machine such as tenter stretching machine and biaxial stretching machine may be used. As the temperature at which the transparent film is stretched, an appropriate value may be arbitrarily selected according to the purpose. Preferably, the stretching is performed at a temperature ranging from Tg−20° C. to Tg+30° C. with respect to the glass transition temperature (Tg) of the polymer film. By selecting such a condition, the retardation value is likely to become uniform and at the same time, crystallization (clouding) of the film can hardly occur. Specifically, the stretching temperature is from 90 to 210° C., preferably from 100 to 200° C., more preferably from 100 to 180° C. The stretch ratio of the transparent film may be appropriately selected according to the purpose. The stretch ratio is preferably from more than 1 to 6 times, more preferably from more than 1.5 to 4 times, still more preferably from more than 2.0 to 3 times.

[Thickness of Transparent Film]

The thickness of the transparent film of the present invention may vary depending on use but is preferably 200 μm or less, more preferably 150 μm or less, still more preferably 100 μm or less. If the thickness is large, the amount of the material used is increased and the uniformity is difficult to control, as a result, the film may not be applicable to a device requiring accuracy, thinness and homogeneity.

The lower limit of the thickness of the transparent film of the present invention is preferably 20 μm or more, more preferably 30 μm or more. If the thickness is too small, the film becomes hard to handle and wrinkles may be generated or lamination to another film or sheet such as protective film may be made difficult, whereas if the thickness is too large, a larger amount of a resin is required for producing a film having the same area and this is inefficient, or the thickness of a product using the film may be increased.

[Physical Properties of Transparent Film]

<Birefringence>

In the transparent film obtained by molding the polycarbonate resin of the present invention, the birefringence is preferably 0.001 or more. In order to design the film molded using the polycarbonate resin to be very thin, the birefringence is preferably higher. Accordingly, the birefringence is more preferably 0.002 or more. If the birefringence is less than 0.001, the thickness of the film must be made excessively large, as a result, the amount of a material used is increased and control of homogeneity in terms of thickness, transparency and retardation becomes difficult. Because of this, when the birefringence is less than 0.001, the transparent film produced using the polycarbonate resin may not be applicable to a device requiring accuracy, thinness and homogeneity.

<Refractive Index>

In the transparent film obtained by molding the polycarbonate resin of the present invention, the refractive index at the wavelength of sodium d line (589 nm) is preferably from 1.57 to 1.62. If this refractive index is less than 1.57, the birefringence may become too small. On the other hand, if the refractive index exceeds 1.62, the reflectance may be increased and the optical transparency may be reduced.

In the transparent film of the present invention, the refractive indices nx and ny in two directions in a plane and the refractive index nz in the thickness direction preferably satisfy any one relationship of the following formulae (i) to (iii):

$$nx > ny = nz \quad (i)$$

$$nx > ny > nz \quad (ii)$$

$$nx > nz > ny \quad (iii)$$

When the refractive indexes have the relationship of nx>ny=nz, a uniaxial retardation film such as λ plate, λ/2 plate and λ/4 plate is obtained, and the film can be used in a viewing angle compensator of a liquid crystal display or for color correction of reflected light in a reflective display, a transflective display, an organic EL device or the like.

When the refractive indices have the relationship of nx>ny>nz, the film can be used as a viewing angle compensator of a liquid crystal display, particularly as a viewing angle compensator in the VA mode, which is of a type performing compensation by one sheet or of a type performing compensation by two sheets. Also, the film can be used as a film for color correction of reflected light, similarly to the above.

When the refractive indices have the relationship of nx>nz>ny, the film can be used as a viewing angle correction film of a polarizing plate or as a viewing angle correction film of a circularly polarizing plate and, similarly to the above, can be used as a film for color correction of reflected light. Also, not only the front viewing angle but also other viewing angles can be compensated.

In the transparent film of the present invention, the refractive indices nx and ny in two directions in a plane, the refractive index nz in the thickness direction, and the thickness d preferably satisfy the following relationships (iv) and (v):

$$NZ \text{ Coefficient}=(nx-nz)/(nx-ny)=0.2 \text{ to } 8 \quad (iv)$$

$$\Delta nd=(nx-ny) \cdot d=30 \text{ to } 400 \text{ nm} \quad (v)$$

By setting the NZ coefficient to the range above, a retardation film for viewing angle compensation or a retardation film for color correction, which are used in various displays, can be produced.

If the NZ coefficient is less than 0.2, a very special production method is required, as a result, there may arise a problem that the NZ coefficient accuracy is poor and the productivity is reduced.

If the NZ coefficient exceeds 8, the value of retardation in the thickness direction of a layer as calculated according to the formula: Rth=(nx−nz)·d becomes very large, and the thickness of a material must be increased, as a result, there may arise a trouble that the material cost rises or the retardation reliability is reduced.

By setting the Δnd to the range above, a λ/2 plate or a λ/4 plate can be easily fabricated.

If the Δnd is less than 30 nm, this is the region of C-plate that is a so-called negatively uniaxial retardation film. Viewing angle compensation of a display cannot be performed by C-plate alone and requires another retardation film, as a result, the total number of retardation films is increased, which may disadvantageously make it difficult to reduce the thickness or reduce the cost.

If the Δnd exceeds 400 nm, the thickness must be increased so as to develop a high retardation, and this may give rise to reduction in the productivity or reliability.

<Retardation>

In the transparent film of the present invention, the ratio (R450/R550) of the retardation R450 measured at a wavelength of 450 nm to the retardation R550 measured at a wavelength of 550 nm preferably satisfies the following formula (1), and R450/R550 is more preferably from 0.7 to less than 1.0, still more preferably from 0.75 to less than 0.97.

$$0.5 < R450/R550 < 1.0 \quad (1)$$

When R450/R550 is in this range, retardation is developed as the wavelength is shorter, and ideal retardation characteristics can be obtained at each wavelength in the visible region. For example, when a retardation film having such wavelength dependency is produced as a ¼λ plate and laminated to a polarizing plate, a circularly polarizing plate or the like can be produced, and a polarizing plate and a display device, where the hue is less wavelength-dependent and is neutral, can be realized. On the other hand, if the ratio above is out of the range specified, the hue has a large wavelength dependency, and there arises a problem of coloration in a polarizing plate or a display device.

Also, in the transparent film of the present invention, with respect to the ratio R450/R550 of the retardation R450 to the retardation R550, R450/R550 at the initial stage (that is, immediately after molding) (referred to as "$(R450/R550)_0$") and R450/R550 after holding at 90° C. for 48 hours (referred to as "$(R450/R550)_{48}$") preferably satisfy the following formula (II), and $|(R450/R550)_{48}-(R450/R550)_0|$ is more preferably from more than 0 to 0.012, still more preferably from more than 0 to 0.10.

$$0 < |(R450/R550)_{48}-(R450/R550)_0| < 0.015 \quad (II)$$

When $|(R450/R550)_{48}-(R450/R550)_0|$ is not more than the upper limit above, the transparent film is advantageously insusceptible to variation of the retardation even when used for a long time under a high-temperature condition and is excellent in the temperature-resistant stability. This value is preferably closer to 0.

<Water Absorption Percentage>

The transparent film of the present invention preferably has a water absorption percentage of more than 1.0 wt %. When the water absorption percentage is more than 1.0 wt %, adhesiveness can be easily secured at the time of laminating the transparent film to another film or the like. For example, at the lamination to a polarizing plate, since the transparent film is hydrophilic, the contact angle of water is low, facilitating free design of the adhesive, and high adhesion can be designed. If the water absorption percentage is 1.0 wt % or less, the film becomes hydrophobic, and the contact angle of water is high, making it difficult to design the adhesiveness. Also, the film is readily charged, and this poses a problem that its incorporation into a polarizing plate or a display device allows for inclusion or the like of an extraneous matter, leading to an increase in the appearance defects.

On the other hand, if the water absorption percentage exceeds 2.0 wt %, durability of optical characteristics under humidity environment is deteriorated and this is not preferred.

Accordingly, in the transparent film of the present invention, the water absorption percentage is preferably from more than 1.0 wt % to 2.0 wt %, more preferably from 1.1 to 1.5 wt %.

<Transmittance>

In the transparent film of the present invention, irrespective of the thickness, the total light transmittance of the transparent film itself is preferably 80% or more, and this transmittance is more preferably 90% or more. When the transmittance is not less than the lower limit above, a transparent film with less coloration is obtained and when the film is laminated to a polarizing plate, the resultant polarizing plate has a high degree of polarization and a high transmittance, so that by combining it with a display device, a high display quality can be realized. Incidentally, the transmittance of the transparent film of the present invention is not particularly limited in its upper limit but is usually 99% or less.

[Usage]

The transparent film of the present invention is not particularly limited in its usage but by taking advantage of the characteristics that the film is insusceptible to variation of the retardation even when used for a long time under a high-temperature condition and is excellent in the temperature-resistant stability, the transparent film is suitably used for an optical film such as retardation film employed in various liquid crystal display devices, mobile devices and the like.

For example, a polarizing plate can be fabricated by stacking the transparent film of the present invention and a polarizer.

As the polarizer, known polarizers having various configurations can be employed. For example, a polarizer prepared by a conventionally known method of adsorbing iodine or a dichroic substance such as dichroic dye onto various films, thereby dyeing the film, and subjecting the film to crosslinking, stretching and drying, can be used.

EXAMPLES

The present invention is described in greater detail below by referring to Examples, but the present invention is not limited to these Examples as long as the purport thereof is observed.

In the following, the characteristic evaluations of the polycarbonate resin and transparent film were performed by the methods described below. Incidentally, the methods for characteristic evaluations are not limited to the following methods and can be appropriately selected by one skilled in the art.

[Evaluation of Polycarbonate Resin]

(1) Glass Transition Temperature (Tg)

Using a differential scanning calorimeter (manufactured by SII Nano Technology, DSC220), about 10 mg of the polycarbonate resin was heated at a temperature rise rate of 10° C./min and measured, and in accordance with JIS-K7121 (1987), an extrapolated glass transition initiation temperature that is a temperature at the intersection between a straight line drawn by extending the low temperature-side base line toward the high temperature side and a tangential line drawn at the point where the curve of the stepwise changing part of glass transition has a maximum gradient, was determined and taken as the glass transition temperature.

(2) Reduced Viscosity

The reduced viscosity of the polycarbonate resin solution was measured at a temperature of 20.0° C.±0.1° C. by using an Ubbelohde viscosity tube manufactured by Moritomo Rika Kogyo and using methylene chloride as a solvent. The concentration was precisely adjusted to 0.6 g/dL.

The relative viscosity $\eta rel$ was determined from the flow-through time $t0$ of the solvent and the flow-through time $t$ of the solution according to the following formula:

$$\eta rel = t/t0$$

The specific viscosity $\eta sp$ was determined from the relative viscosity $\eta rel$ according to the following formula:

$$\eta sp = (\eta - \eta 0)/\eta 0 = \eta rel - 1$$

The reduced viscosity (reduced viscosity) $\eta red$ was determined by dividing the specific viscosity $\eta sp$ by the concentration c (g/dL) according to the following formula:

$$\eta red = \eta sp/c$$

A higher value indicates a larger molecular weight.

(3) Melt Viscosity

Using a capillograph, Model CAPIROGRAPH 1B, manufactured by Toyo Seiki Seisaku-Sho, Ltd., the melt viscosity was measured at a temperature of 250° C. and a shear rate of 91.2 sec$^{-1}$ under the conditions of an orifice length of 10 mm and an orifice diameter of 1 mm.

(4) Photoelastic Coefficient

<Production of Sample>

Under the conditions of a hot press temperature of 200 to 250° C., preheating for 1 to 3 minutes and a pressure of 20 MPa, 4.0 g of a polycarbonate resin sample vacuum-dried at 80° C. for 5 hours was pressed for 1 minute with a hot press by using a spacer having a width of 8 cm, a length of 8 cm and a thickness of 0.5 mm and thereafter, the pressed resin was taken out together with the spacer and pressed/cooled for 3 minutes at a pressure of 20 MPa by means of a water tube-cooled press to produce a sheet. A sample having a width of 5 mm and a length of 20 mm was cut out of the sheet.

<Measurement>

The measurement was performed using an apparatus combining a birefringence measuring apparatus composed of a He—Ne laser, a polarizer, a compensator, an analyzer and a photodetector with a vibration-type viscoelasticity measuring apparatus ("DVE-3", manufactured by Rheology) (for details, see Journal of the Society of Rheology Japan, Vol. 19, pp. 93-97 (1991)).

The sample cut out was fixed in the viscoelasticity measuring apparatus, and the storage modulus E' was measured at a room temperature of 25° C. at a frequency of 96 Hz. At the same time, laser light emitted was passed through the polarizer, the sample, the compensator and the analyzer in this order and collected in the photodetector (photodiode). With respect to the waveform at an angular frequency of $\omega$ or $2\omega$, the retardation for the amplitude and strain was determined through a lock-in amplifier, and the strain-optical coefficient O' was determined. At this time, the directions of the polarizer and the analyzer were crossing at a right angle and each was adjusted to make an angle of $\pi/4$ with the extension direction of the sample.

The photoelastic coefficient C was determined using the storage modulus E' and the strain-optical coefficient O' according to the following formula:

$$C = O'/E'$$

[Evaluation of Transparent Film]

(1) Film Thickness

The thickness was measured using a contact-type thickness gauge, "PEACOCK" (product name), manufactured by Ozaki MFG. Co., Ltd.

(2) Retardation

With respect to a sample cut out into a width of 4 cm and a length of 4 cm from the transparent film obtained by performing melt film forming and uniaxial stretching of a polycarbonate resin, the retardation R450 at a wavelength of 450 nm and the retardation R550 at a wavelength of 550 nm were measured in a room at 23° C. by ["AxoScan" (product name) manufactured by Axometrics Inc.], and the ratio of the measured retardation R450 to the retardation R550 was calculated.

As for the retardation, a transparent film immediately after molding was measured for the retardation R450 (hereinafter, referred to as "$(R450)_0$") and the retardation R550 (hereinafter, referred to as "$(R550)_0$") and at the same time, after holding at 90° C. for 48 hours, the transparent film was measured for the retardation R450 (hereinafter, referred to as "$(R450)_{48}$") and the retardation R550 (hereinafter, referred to as "$(R550)_{48}$"). In respective cases, $(R450)_0/(R550)_0$ (hereinafter, simply referred to as "$(R450/R550)_0$") and $(R450)_{48}/(R550)_{48}$ (hereinafter referred to as "$(R450/R550)_{48}$") were determined, and from these values, $|(R450/R550)_{48}-(R450/R550)_0|$ was determined.

Example 1

Into a reaction vessel, 432.1 Parts by weight of isosorbide (hereinafter, sometimes simply referred to as "ISB"), 906.3 parts by weight of 9,9-(4-(2-hydroxyethoxy)phenyl)fluorene (hereinafter, sometimes simply referred to as "BHEPF"), 26.3 parts by weight of 1,4-cyclohexanedimethanol (hereinafter, sometimes simply referred to as "CHDM"), 1137.5 parts by weight of diphenyl carbonate (hereinafter, sometimes simply referred to as "DPC"), and 6.4 parts by weight of cesium carbonate (a 0.2 wt % aqueous solution) as a catalyst were charged. As the first-stage process of reaction, in a nitrogen atmosphere, the heat medium temperature of the reaction vessel was set to 150° C. to dissolve the raw materials with stirring, if desired (about 15 minutes). Subsequently, the pressure in the reaction vessel was reduced from atmospheric pressure to 13.3 kPa, and while raising the heat medium temperature of the reaction vessel to 190° C. over 1 hour, the phenol generated was withdrawn out of the reaction vessel.

After holding the temperature in the reaction vessel at 190° C. for 15 minutes, as the second-stage process, the pressure in the reaction vessel was set to 6.67 kPa and while raising the heat medium temperature of the reaction vessel to 230° C. over 15 minutes, the phenol generated was withdrawn out of reaction vessel. The stirring torque of the stirrer was increased and therefore, the temperature was raised to 250° C. over 8 minutes. Furthermore, the pressure in the reaction vessel was reduced to 200 Pa or less so as to remove the phenol generated. After reaching the predetermined stirring torque, the reaction was terminated. The reaction product obtained was extruded in water and then pelletized to obtain Polycarbonate Resin A composed of BHEPF/ISB/CHDM=39.7 mol %/56.8 mol %/3.5 mol %. Physical properties of Polycarbonate Resin A obtained were measured, and the measured values are shown in Table 1.

Polycarbonate Resin A obtained was vacuum-dried at 80° C. for 5 hours, and a film having a thickness of 100 μm was produced therefrom by using a film-forming apparatus equipped with a single-screw extruder (manufactured by Isuzu Kakoki, screw diameter: 25 mm, cylinder preset temperature: 220° C.), a T-die (width: 200 mm, preset temperature; 220° C.), a chill roll (preset temperature: 120 to 130° C.) and a winder. A sample having a width of 6 cm and a length of 6 cm was cut out of the film, and this sample was uniaxially stretched to 1×2.0 times at a stretching speed of 720 mm/m (stain rate: 1,200%/min) by using a batch-type biaxial stretching apparatus (manufactured by Toyo Seiki Seisaku-Sho, Ltd.) and adjusting the stretching temperature such that the retardation $(R550)_0$ became 130±20 nm, whereby a transparent film was obtained. At this time, the film was stretched in a state of being held (stretch ratio: 1.0) in the direction perpendicular to the stretch direction.

Physical properties of the stretched transparent film obtained were measured, and the measured values are shown in Table 1.

Example 2

Production of Polycarbonate Resin B and molding of a transparent film from Polycarbonate Resin B were performed in the same manner as in Example 1 except that in Example 1, 489.7 parts by weight of ISB, 856 parts by weight of BHEPF, 16 parts by weight of polyethylene glycol having a molecular weight of 1,000 (hereinafter, sometimes simply referred to as "PEG #1000"), 1,162.2 parts by weight of DPC, and 6.5 parts by weight of an aqueous cesium carbonate solution as a catalyst were used. The composition of Polycarbonate Resin B obtained was BHEPF/ISB/PEG #1000=36.7 mol %/63.0 mol %/0.3 mol %. Evaluation results of the polycarbonate resin and the transparent film are shown in Table 1.

Example 3

Production of Polycarbonate Resin C and molding of a transparent film from Polycarbonate Resin C were performed in the same manner as in Example 1 except that in Example 1, 432.0 parts by weight of ISB, 906.3 parts by weight of BHEPF, 30.3 parts by weight of PEG #1000, 1,104.1 parts by weight of DPC, and 6.2 parts by weight of an aqueous cesium carbonate solution as a catalyst were used. The composition of Polycarbonate Resin C obtained was BHEPF/ISB/PEG #1000=40.9 mol %/58.5 mol %/0.6 mol %. Evaluation results of the polycarbonate resin and the transparent film are shown in Table 1.

Example 4

Production of Polycarbonate Resin D and molding of a transparent film from Polycarbonate Resin D were performed in the same manner as in Example 1 except that in Example 1, 444.7 parts by weight of ISB, 906.8 parts by weight of BHEPF, 15.4 parts by weight of polyethylene glycol having a molecular weight of 2,000 (hereinafter, sometimes simply referred to as "PEG #2000"), 1,118.5 parts by weight of DPC, and 6.3 parts by weight of an aqueous cesium carbonate solution as a catalyst were used. The composition of Polycarbonate Resin D obtained was BHEPF/ISB/PEG #2000=40.4 mol %/59.45 mol %/0.15 mol %. Evaluation results of the polycarbonate resin and the transparent film are shown in Table 1.

Example 5

Production of Polycarbonate Resin E and molding of a transparent film from Polycarbonate Resin E were performed in the same manner as in Example 1 except that in Example 1, 432.4 parts by weight of ISB, 906.3 parts by weight of BHEPF, 30.2 parts by weight of PEG #2000, 1,101.4 parts by weight of DPC, and 6.2 parts by weight of an aqueous cesium carbonate solution as a catalyst were used. The composition of Polycarbonate Resin E obtained was BHEPF/ISB/PEG

2000=41.0 mol %/58.7 mol %/0.3 mol %. Evaluation results of the polycarbonate resin and the transparent film are shown in Table 1.

Comparative Example 1

Production of Polycarbonate Resin F and molding of a transparent film from Polycarbonate Resin F were performed in the same manner as in Example 1 except that in Example 1, 433.4 parts by weight of ISB, 934.1 parts by weight of BHEPF, 1,113.5 parts by weight of DPC, and 6.2 parts by weight of an aqueous cesium carbonate solution as a catalyst were used. The composition of Polycarbonate Resin F obtained was BHEPF/ISB=41.8 mol %/58.2 mol %. Evaluation results of the polycarbonate resin and the transparent film are shown in Table 1.

Comparative Example 2

Production of Polycarbonate Resin G and molding of a transparent film from Polycarbonate Resin G were performed in the same manner as in Example 1 except that in Example 1, 357.2 parts by weight of ISB, 896.8 parts by weight of BHEPF, 103.9 parts by weight of diethylene glycol (hereinafter, sometimes simply referred to as "DEG"), 1,194.8 parts by weight of DPC, and 6.7 parts by weight of an aqueous cesium carbonate solution as a catalyst were used. The composition of Polycarbonate Resin G obtained was BHEPF/ISB/DEG=37.4 mol %/44.7 mol %/17.9 mol %. Evaluation results of the polycarbonate resin and the transparent film are shown in Table 1.

Comparative Example 3

Production of Polycarbonate Resin H and molding of a transparent film from Polycarbonate Resin H were performed in the same manner as in Example 1 except that in Example 1, 390.9 parts by weight of ISB, 920.5 parts by weight of BHEPF, 62.9 parts by weight of PEG #1000, 1,056.8 parts by weight of DPC, and 5.9 parts by weight of an aqueous cesium carbonate solution as a catalyst were used. The composition of Polycarbonate Resin H obtained was BHEPF/ISB/PEG #1000 43.4 mol %/55.3 mol %/1.3 mol %. Evaluation results of the polycarbonate resin and the transparent film are shown in Table 1.

In Table 1, the dihydroxy compound represented by formula (1), the dihydroxy compound represented by formula (2), and the dihydroxy compound represented by any one of formulae (3) to (6) are simply referred to as "compound of formula (1)", "compound of formula (2)" and "compound of formulae (3) to (6)", respectively.

Also, in Table 1, the melt film-formability indicates the following rating at the melt film formation of the polycarbonate resin.

A: When the presence or absence of an extraneous matter or an air bubble in the film was examined with an eye, a defect was not observed.

C: When the presence or absence of an extraneous matter or an air bubble in the film was examined with an eye, a defect was observed.

TABLE 1

| | | | Example 1 | Example 2 | Example 3 | Example 4 | Example 5 | Comparative Example 1 | Comparative Example 2 | Comparative Example 3 |
|---|---|---|---|---|---|---|---|---|---|---|
| Ratio of dihydroxy compounds (mol %) | Compound of formula (1) | BHEPF | 39.7 | 36.7 | 40.9 | 40.4 | 41 | 41.8 | 37.4 | 43.4 |
| | Compound of formula (2) | ISB | 56.8 | 63 | 58.5 | 59.45 | 58.7 | 58.2 | 44.7 | 55.3 |
| | Compound of formulae (3) to (6) | CHDM | 3.5 | — | — | — | — | — | — | — |
| | | PEG #1000 | — | 0.3 | 0.6 | — | — | — | — | 1.3 |
| | | PEG #2000 | — | — | — | 0.15 | 0.3 | — | — | — |
| | | DEG | — | — | — | — | — | — | 17.9 | — |
| Ratio of dihydroxy compounds (wt %) | Compound of formula (1) | BHEPF | 64 | 60.3 | 64 | 64 | 64 | 66 | 66 | 67.0 |
| | Compound of formula (2) | ISB | 33.9 | 38.5 | 33.9 | 34.9 | 34 | 34 | 26.3 | 28.4 |
| | Compound of formulae (3) to (6) | CHDM | 2.1 | — | — | — | — | — | — | — |
| | | PEG #1000 | — | 1.1 | 2.1 | — | — | — | — | 4.6 |
| | | PEG #2000 | — | — | — | 1 | 2 | — | — | — |
| | | DEG | — | — | — | — | — | — | 7.6 | — |
| Physical properties of polycarbonate resin | Glass transition temperature (° C.) | | 148 | 145 | 140 | 143 | 137 | 151 | 122 | 129 |
| | Reduced viscosity (dl/g) | | 0.322 | 0.339 | 0.343 | 0.368 | 0.37 | 0.317 | 0.421 | 0.382 |
| | Melt viscosity 240° C., 91.2 sec$^{-1}$ (Pa·sec) | | 2110 | 2050 | 2130 | 2080 | 2210 | 2100 | 1950 | 2105 |
| | Photoelastic coefficient ($\times 10^{12}$ Pa$^{-1}$) | | 35 | 33 | 34 | 36 | 35 | 36 | 29 | 30 |
| Melt film-formability | | | A | A | A | A | A | C | A | A |
| Film thickness (μm) | | | 72 | 70 | 78 | 74 | 74 | 66 | 78 | 65 |
| Physical properties of transparent film | $(R450)_0$ (nm) | | 127.2 | 136.6 | 126.5 | 130.9 | 129.9 | 130.2 | 117.6 | 109.6 |
| | $(R550)_0$ (nm) | | 142.1 | 146 | 139.8 | 144.1 | 143.2 | 143.2 | 131.1 | 124.4 |
| | $(R450/R550)_0$ | | 0.895 | 0.936 | 0.905 | 0.908 | 0.907 | 0.909 | 0.897 | 0.881 |
| | $(R450)_{48}$ (nm) | | 134.3 | 143 | 135.2 | 139.1 | 138.3 | 138.2 | 131.2 | 119.2 |
| | $(R550)_{48}$ (nm) | | 148.5 | 152.1 | 147.9 | 152 | 151 | 150.4 | 143.6 | 133 |
| | $(R450/R550)_{48}$ | | 0.904 | 0.94 | 0.914 | 0.915 | 0.916 | 0.919 | 0.914 | 0.896 |
| | $\|(R450/R550)_{48} - (R450/R550)_0\|$ | | 0.0092 | 0.0047 | 0.0093 | 0.0067 | 0.0088 | 0.0066 | 0.0166 | 0.0152 |

It is seen from Table 1 that the polycarbonate resin of the present invention is excellent in the melt film-formability and the transparent film obtained by molding the polycarbonate resin is excellent in the temperature stability of the retardation.

While the invention has been described in detail and with reference to specific embodiments thereof, it will be apparent to one skilled in the art that various changes and modifications can be made therein without departing from the spirit and scope of the invention. This application is based on Japanese Patent Application (Patent Application No. 2011-104546) filed on May 9, 2011, the contents of which are incorporated herein by way of reference.

The invention claimed is:

1. A polycarbonate resin comprising:
a structural unit derived from a dihydroxy compound represented by the following formula (1),
a structural unit derived from a dihydroxy compound represented by the following formula (2), and
a structural unit derived from at least one dihydroxy compounds selected from the group consisting of a dihydroxy compound represented by the following formula (3), a dihydroxy compound represented by the following formula (4), a dihydroxy compound represented by the following formula (5) and a dihydroxy compound represented by the following formula (6),
wherein:
the content of structural units derived from dihydroxy compounds represented by the following formulae (3) to (6) is from 0.1 wt % to less than 4.5 wt % based on the total of structural units derived from dihydroxy compounds in the polycarbonate resin:

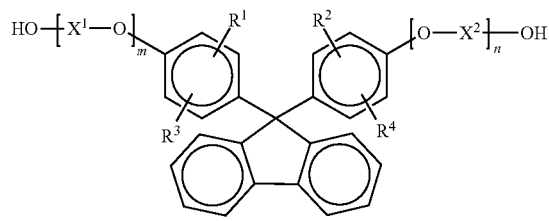 (1)

wherein each of $R^1$ to $R^4$ independently represents a hydrogen atom, a substituted or unsubstituted alkyl group having 1 to 20 carbon atoms, a substituted or unsubstituted cycloalkyl group having 6 to 20 carbon atoms, or a substituted or unsubstituted aryl group having 6 to 20 carbon atoms, each of $X^1$ and $X^2$ independently represents a substituted or unsubstituted alkylene group having 2 to 10, a substituted or unsubstituted cycloalkylene group having 6 to 20 carbon atoms, or a substituted or unsubstituted arylene group having 6 to 20 carbon atoms, and each of m and n is independently an integer of 0 to 5;

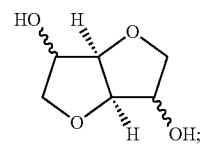 (2)

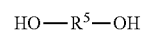 (3)

wherein $R^5$ represents a substituted or unsubstituted cycloalkylene group having 4 to 20 carbon atoms;

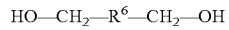 (4)

wherein $R^6$ represents a substituted or unsubstituted cycloalkylene group having 4 to 20 carbon atoms;

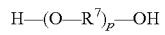 (5)

wherein $R^7$ represents a substituted or unsubstituted alkylene group having 2 to 10 carbon atoms, and p is an integer of 2 to 50;

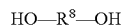 (6)

wherein $R^8$ represents a substituted or unsubstituted alkylene group having 2 to 20 carbon atoms, or a group containing a substituted or unsubstituted acetal ring.

2. The polycarbonate resin according to claim 1, wherein the polycarbonate resin has a glass transition temperature in the range of 125 to 150° C.

3. The polycarbonate resin according to claim 1, wherein the polycarbonate resin has a melt viscosity at a temperature of 240° C. and a shear rate of 91.2 sec$^{-1}$ in the range of 500 to 2,500 Pa·sec.

4. The polycarbonate resin according to claim 1, wherein the polycarbonate resin has a reduced viscosity in the range of 0.30 to 1.2 dL/g.

5. A transparent film obtained by molding the polycarbonate resin according to claim 1.

6. The transparent film according to claim 5, which is obtained by molding the polycarbonate resin by a melt film-forming method at a molding temperature of 265° C. or less.

7. The transparent film according to claim 6, which is stretched at least in one direction.

8. The transparent film according to claim 5, wherein the ratio of the retardation R450 measured at a wavelength of 450 nm to the retardation R550 measured at a wavelength of 550 nm satisfies the following formula (I):

$$0.5 < R450/R550 < 1.0 \qquad (I).$$

9. The transparent film according to claim 8, wherein with respect to the ratio R450/R550 of the retardation R450 to the retardation R550, assuming that the initial R450/R550 is $(R450/R550)_0$ and the R450/R550 after holding at 90° C. for 48 hours is $(R450/R550)_{48}$, the following formula (II) is satisfied:

$$0 < |(R450/R550)_{48} - (R450/R550)_0| < 0.015 \qquad (II).$$

* * * * *